United States Patent [19]

Zweifel

[11] Patent Number: 4,609,988
[45] Date of Patent: Sep. 2, 1986

[54] AUTOMATIC PREDICTION AND CAPTURE OF A PRESELECTED ALTITUDE FOR AIRCRAFT

[75] Inventor: Terry L. Zweifel, Phoenix, Ariz.

[73] Assignee: Sperry Corporation, New York, N.Y.

[21] Appl. No.: 476,090

[22] Filed: Mar. 17, 1983

[51] Int. Cl.[4] ............................................. G05D 1/08
[52] U.S. Cl. ................................... 364/433; 244/180; 318/584
[58] Field of Search ............... 364/433, 434, 435, 427; 244/178–181, 183, 185, 186; 340/959, 977; 318/584; 73/178 T

[56] References Cited

U.S. PATENT DOCUMENTS

| | | | |
|---|---|---|---|
| 3,510,092 | 5/1970 | Hendrick et al. | 244/180 |
| 3,545,703 | 12/1970 | Doniger et al. | 364/430 |
| 3,604,908 | 9/1971 | Loome et al. | 364/430 |
| 3,691,356 | 9/1972 | Miller | 364/427 |
| 3,715,718 | 2/1973 | Astengo | 244/180 |
| 4,019,702 | 4/1977 | Annin | 364/427 |
| 4,114,842 | 9/1978 | Hofferber et al. | 364/433 |

Primary Examiner—Errol A. Krass
Assistant Examiner—Thomas G. Black
Attorney, Agent, or Firm—Howard P. Terry

[57] ABSTRACT

An improved flight control system for initiating and thereafter controlling the automatic capture of a preselected altitude is described. At any point in the flight and in any autopilot pitch submode, the remaining time before an altitude capture is to commence is computed and used as a limiting signal such that the aircraft is precisely aligned with the commanded capture flight path when the capture maneuver commences thereby obviating mode to mode transients. The aircraft's altitude rate is continuously monitored during the capture maneuver and the flight path command is automatically altered between asymptotic and circular paths to assure that the acceleration normal to the flight path will not exceed a predetermined value while at the same time allowing a timely altitude capture.

13 Claims, 3 Drawing Figures

AUTOMATIC PREDICTION AND CAPTURE OF A PRESELECTED ALTITUDE FOR AIRCRAFT

BACKGROUND OF THE INVENTION

1. Field of the Invention

The present invention relates generally to automatic flight control systems for aircraft and more specifically to prediction of the commencement of altitude acquisition and the control of the aircraft flight path during actual altitude capture in such a way as to maintain accelerations normal to the flight path at or below a predetermined value.

2. Description of the Prior Art

Most modern commercial transport aircraft, general aviation aircraft and military aircraft are equipped with an automatic flight control system. These automatic flight control systems generally provide the human pilot with the capability of altering the flight path of the aircraft to achieve and maintain a desired flight reference such as Mach number, airspeed, vertical speed, glide slope and the like.

In addition, most automatic flight control systems include an altitude capture subsystem whereby a desired altitude may be preselected by the human pilot while the aircraft is at an entirely different altitude and upon achieving predetermined conditions automatically capturing that altitude. During the climb (or descent) to the preselected altitude, the aircraft's air data computer continuously supplies the altitude capture submode parameters, altitude error, the difference between the preselected altitude and the actual altitude hereinafter referred to as $h_e$, and the actual vertical speed or altitude rate, hereinafter referred to as $\dot{h}_a$. At a predetermined combination of $h_e$ and $\dot{h}_a$, the capture of the preselected altitude commences. Generally representative of such a prior art altitude capture submode is that of Miller U.S. Pat. No. 3,240,446 entitled "Preselected Altitude Control System for Aircraft", issued Mar. 15, 1966 also assigned to the present assignee. In the Miller system, altitude capture commences when the term $(h_e - K\dot{h}_a)$ reaches a null value and by maintaining $(h_e - K\dot{h}_a)$ near zero, an asymptotic flight path to the preselected altitude results. The value of the constant K defines the time constant or duration of the capture maneuver and is generally chosen to provide a timely altitude capture while keeping the aircraft's acceleration normal to the flight path, the g effect, at an acceptable comfortable value. For small values of K, unacceptable acceleration levels may be experienced when the aircraft is at relatively high altitude rates at capture initiation. Conversely, for large values of K, an unacceptable long time-to-altitude capture period occurs with lower altitude rates at capture initiation.

Another prior art altitude capture submode is defined in the present assignee's pending application, Flannigan et al, Ser. No. 197,735, now U.S. Pat. No. 4,377,848 filed Oct. 16, 1980 and entitled "Altitude Capture Mode for Aircraft Automatic Flight Control System", wherein the value of K is proportional to the actual altitude rate of the aircraft at capture initiation thereby commanding a circular arc flight path for the altitude capture maneuver. While this scheme permits the commanding of a predetermined constant acceleration normal to the flight path, it results in altitude capture initiation at very large altitude errors for high initial altitude rates and is susceptible to overshooting the desired altitude as the altitude rate, and hence the value of K, is reduced toward null. In addition, the large values of K commensurate with higher initial altitude rates tend to make the system sensitive to atmospheric turbulence, the effect of which on altitude rate measurements by the air data computer is well known.

In both of the aforementioned altitude capture schemes, a fixed path in space relative to the atmosphere is commanded. The time rate of change of the commanded path represents the acceleration of the aircraft relative to the flight path. In Miller, the commanded path results in an asymptotic approach to the preselected altitude and, hence, a varying normal acceleration. In Flannigan, the commanded path is circular, and hence, represents a constant acceleration throughout the altitude capture.

A significant shortcoming of either scheme is that the resultant normal acceleration on the aircraft is not necessarily that which was commanded at the inception of, or during, the capture maneuver. For example, if the altitude rate of the aircraft is increasing just prior to commencement of the capture maneuver due to an autopilot command to capture a commanded speed slower than the actual speed, the actual flight path of the aircraft will initially differ significantly from the commanded flight path. The resultant correction toward the commanded flight path can cause normal accelerations of an unacceptable level.

The present invention overcomes all of the aforementioned shortcomings. It provides a prediction or anticipation of an incipient altitude capture such that the actual flight path of the aircraft corresponds with the commanded flight path at the commencement of the capture manuever. Hence, unacceptable normal accelerations due to aircraft path correction is eliminated. Furthermore, the present invention alters the determination of the value of K such that the commanded capture results in either an asymptotic capture, a circular capture, or a combination of both depending upon existing conditions.

SUMMARY OF THE INVENTION

The present invention provides means for the anticipation or prediction of an imminent commencement of an automatic capture of a preselected altitude to assure correlation of the actual flight path of an aircraft with the commanded flight path of the capture maneuver. Furthermore, the commanded flight path of the capture manuever is adapted as a function of the altitude rate of the aircraft to either an asymptotic flight path, a circular flight path, or a combination of either in order to provide timely altitude captures with minimum accelerations normal to the flight path.

DESCRIPTION OF THE PREFERRED EMBODIMENTS

Figure 1:
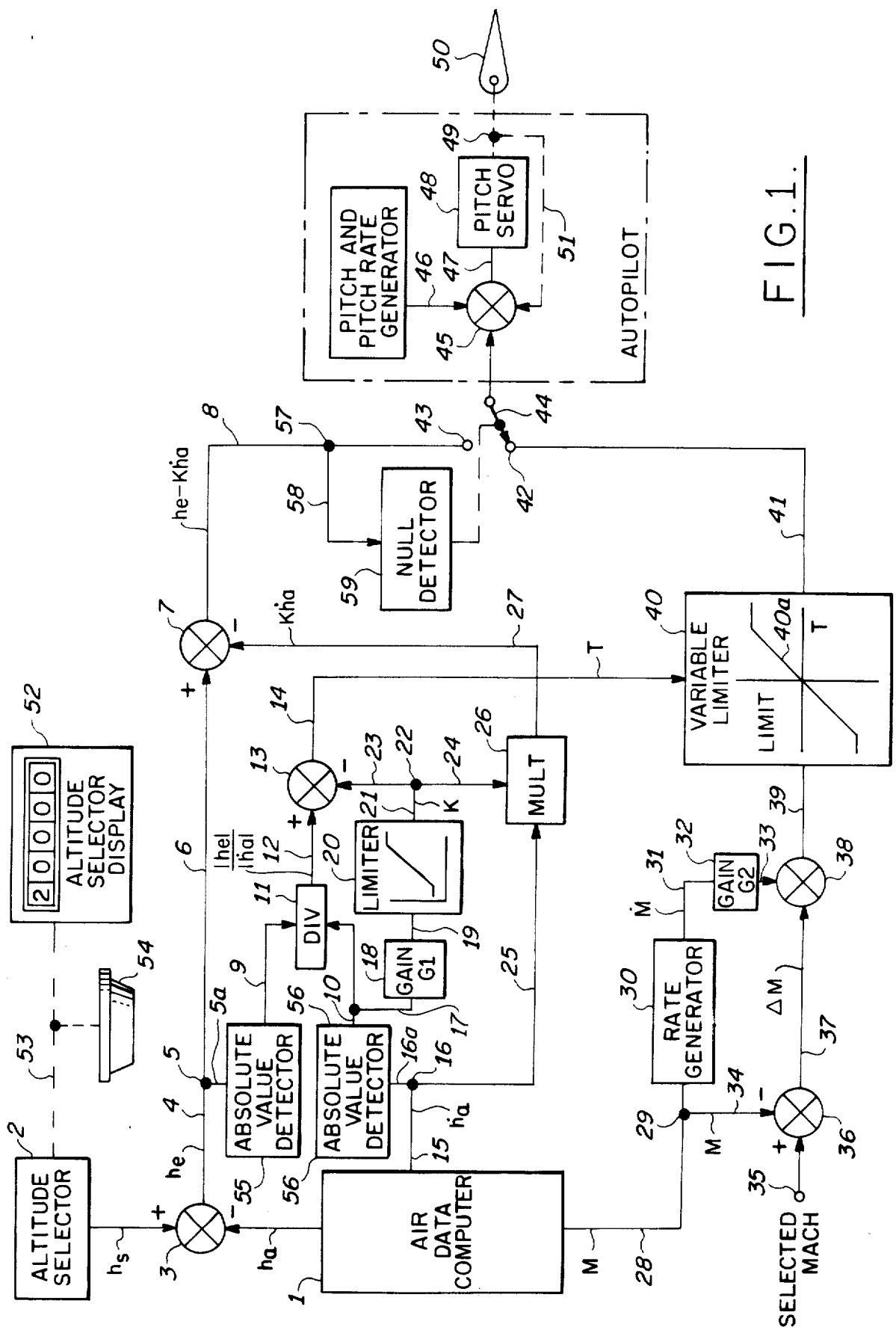
FIG. 1 is a block diagram of an embodiment of the present invention showing an altitude capture from an illustrative Mach number hold submode.

The present invention is useful in any automatic pilot system or in any performance management system (PMS) that is fully coupled to an automatic pilot system and provides apparatus for automatically and adaptively transitioning the aircraft from a climb or descent mode to an altitude capture mode. In a PMS, for example, it is often desirable to maintain a predetermined programmed airspeed or Mach number during the climb or descent to a predetermined or programmed altitude or manually preselected altitude and to automatically capture and thereafter hold such altitude. Similarly in an automatic pilot system, it is also often desired to provide an automatic climb or descent mode terminating in the capture of a preselected altitude. In either system, the climb or descent is usually performed at some desired or commanded airspeed, Mach number or vertical speed, this commanded parameter being controlled by controlling the aircraft pitch attitude. In the following illustrated embodiment, the climb or descent is made at a commanded constant Mach number which speed is maintained by controlling aircraft pitch attitude. The invention is of course applicable to other than this mode.

To illustrate the invention, assume that the aircraft has been commanded to climb at some predetermined or programmed Mach number and that after the climb the aircraft is to capture and maintain a programmed or preselected altitude. If toward the end of the climb the commanded speed is reduced for some reason, the Mach-on-pitch speed control will command a pitch up to reduce speed resulting in a greater rate of climb. If the altitude capture mode is initiated before the new speed is obtained, a pitch transient will occur as the command to the autopilot goes from a pitch-up to reduce speed to a pitch-down to capture the altitude, resulting in an excessive acceleration normal to the flight path, i.e., excessive g's which may be uncomfortable or alarming to the crew as well as the passengers. In accordance with the present invention, this transient is substantially reduced or eliminated by predetermining how much time remains before the altitude capture mode is initiated and reducing the limits on the command signal as the time-to-go is reduced.

The altitude capture control law is $$h_e - K\dot{h}_a = 0 \tag{1}$$

where
$h_e$ = altitude error in feet between the selected altitude and the actual altitude.
$\dot{h}_a$ = actual altitude rate in feet per minute (rate of climb).
$K$ = a characterizing constant that determines the shape of the capture flight path and time required to capture the selected altitude.

From equation (1), it is apparent that the time prior to altitude capture initiation is $$T = \left| \frac{h_e}{\dot{h}_a} \right| - K \text{ in minutes} \tag{2}$$

where the vertical bars conventionally represent the absolute value of the enclosed parameters.

Since this time is available from the capture mode parameters, it is used to linearly reduce the limits on the Mach command signal to the autopilot from some maximum value at some predetermined time-to-go to a low or even zero value at capture initiation, thus eliminating the possibility for the transient described above to occur.

Further, in accordance with the present invention, the value of the constant K itself may be varied to assure that excessive g's will not be pulled during the altitude capture mode as well as to adapt the shape of the capture flight path to the actual altitude rate existing at capture initiation or during the capture maneuver.

The value of the constant K is determined from the control law equation (1) above $$K = \frac{h_e}{\dot{h}_a} \tag{3}$$

which in turn determines not only where (in feet) the capture manuevuer will commence but also the shape of the capture flight path, i.e., an exponential path if K remains constant or circular if proportional to $\dot{h}_a$. Taking the derivative of (3), and assuming the selected altitude is not changed $$-\dot{h}_a + K\ddot{h}_a = 0 \tag{4}$$

It can be shown that the maximum g's pulled during the capture are related to $\ddot{h}_a$ as follows:

$$\Delta g = \frac{\ddot{h}_a}{32.17} \tag{5}$$

Therefore:

$$\ddot{h}_a = \Delta g(32.17) \tag{6}$$

Substituting (6) into (4)

$$-\dot{h}_a + K\Delta g(32.17) = 0$$

and again solving for K $$K = \frac{\dot{h}_a}{\Delta g (32.17)} \tag{7}$$

Thus, a desired maximum g to be commanded will define a value of K for any altitude rate at capture initiation. As will be described below, the desired maximum g will be used to determine whether the altitude capture flight path will be asymptotic, circular or a combination of both.

The present invention may be implemented by using conventional analog circuitry and computation techniques or by using conventional wholly digital techniques or by using conventional hybrid digital/analog techniques. To simplify the understanding of the invention, it will be explained by using a generally analog format as shown in FIG. 1, it being understood that the same analog format may also represent, in block diagram form, the program of a programmable digital computer wherein the various analog inputs are converted to digital signals for digital processing and the various digital outputs are converted to analog signals for driving the control surface servomotors and the like. Thus, hereinafter the term voltage, digital word, etc. will be interpreted as a signal, a measure or the like generic term.

Referring to FIG. 1, assume the aircraft is considerably below the preselected altitude and that automatic flight control system is controlling the aircraft flight path to capture a selected or programmed Mach number. Switch blade 44 is in the position shown, contacting terminal 42 since the altitude error is substantially larger than the actual altitude rate and therefore null detector 59 responsive to these signals on leads 8 and 58 maintains switch 44 in the position shown. A signal representative of the actual Mach number, M, of the aircraft is derived, for example, from a conventional air data computer and appears on lead 28. A signal proportional to a selected Mach number, for example, an entry by the human pilot on a suitable control panel or a computed Mach generated for example by a performance management computer to optimize fuel economy, appears on lead 35, is supplied to a conventional summation device 36. The signal at terminal 29 via lead 34, the actual Mach number of the aircraft, is also supplied to summation device 36. The output of summation device 36 appears on lead 37 and is a signal proportional to Mach error; that is, the difference between the selected Mach number and the actual Mach number of the aircraft, $\Delta M$.

The signal at terminal 29 is also impressed on a conventional rate generator 30. The output of rate generator 30 appears on lead 31 and is a signal proportional to the time rate of change of actual Mach number, or Mach rate, $\dot{M}$. Mach rate is multiplied in multiplier 32 by a gain factor G2 to provide damping of the Mach number capture submode in a conventional manner. The output of gain 32 appears on lead 33 and is applied to conventional summation device 38 where it is algebraically added to the Mach error signal on lead 37. Thus, the output of summation device 38 appearing on lead 39 is supplied to the variable limiter 40 of the present invention, which has the characteristic curve 40a shown. The output of the variable limiter 40, which appears on lead 41, is a function of the variable T, the time-to-go to capture initiation as discussed above. The signal on lead 41 is supplied to summation device 45 via terminal 42 and switch blade 44 and constitutes a pitch command for the autopilot as shown. The output of summation device 45 appears on lead 47 and is comprised of the signal at switch 44 added algebraically with pitch angle and pitch rate on lead 46, and elevator position feedback 51 in the well known conventional fashion. The signal on lead 47 is applied to pitch servo 48 to move control surface 50 and, accordingly, to subject the aircraft to a corresponding corrective pitch rate again in a well-known fashion. As discussed above, it is to be understood that the Mach number control is illustrative in nature and that the control could equally as well apply to airspeed control, vertical speed control, flight path angle control and the like. In accordance with one aspect of the current invention, the novel variable limiter 40 is used to restrict the authority of any control law command signal of any of these automatic flight control system submodes. Thus, the apparatus so far described, except for the variable limiter 40, constitutes a generally conventional Mach-on-pitch control system wherein the aircraft pitch attitude is adjusted as a function of Mach error in order to maintain the selected Mach speed during the climb to the selected altitude.

Simultaneous with the Mach hold operation described above, a signal proportional to a selected value of altitude hereinafter referred to as $h_s$, is provided to altitude selector 2 through the mechanical links 53 by the manual setting of an altitude select dial 54, which may also be used to display the value of $h_s$ on a conventional display 52 shown. A signal proportional to the actual altitude of the aircraft $h_a$ derived, for example, from the air data computer 1 is continuously supplied to summation device 3 as is $h_s$ signal from altitude selector 2. The output of summation device 3 on lead 4 therefore represents the value $(h_s - h_a)$ which is, of course, the altitude deviation or altitude error $h_e$. The altitude error signal $h_e$ is supplied to a conventional absolute value detector 55 via terminal 5 and lead 5a. Absolute value detector 55 operates in a conventional manner and may, of course, be either analog or digital in nature. The output of the altitude error absolute value detector 55 appears on lead 9 and is supplied as the numerator of a conventional divider 11.

A signal proportional to the actual altitude rate of the aircraft $\dot{h}_a$, is also continuously supplied on lead 15 from the air data computer 11. This signal appears at terminal 16 and is supplied to an altitude rate absolute value detector 56 via lead 16a. Absolute value detector 56 is identical to absolute value detector 55 previously described. The output of absolute value detector 56 appears on lead 10 and is supplied as the denominator of divider 11. The output of divider 11 on lead 12 represents the absolute value quotient of the $(h_e/\dot{h}_a)$. It can be seen then, that the absolute value of $(h_e/\dot{h}_a)$ is a measure of the time required to reduce $h_e$ to null at the present rate of climb or altitude rate of the aircraft. That is, $(h_e/\dot{h}_a)$ represents the time required for the aircraft to achieve the selected altitude as hereinabove described.

The signal proportional to the absolute value of altitude rate $\dot{h}_a$ also appears on lead 17 and it is supplied to a multiplier 18 which provides a gain adjustment G1. The value of G1 is proportional to the maximum normal acceleration which can be commanded by the control system as discussed above. The output of gain 18 on lead 19 is supplied to a limiter 20 whose limit characteristic is illustrated. Limiter 20 performs the function of determining which segments of the commanded flight path for altitude capture will be asymptotic and/or which portions will be circular in nature. The details of this control will be discussed below.

The output of limiter 20 on lead 21 represents the continuously computed value of K in the equation (3) above. The value of K as mentioned is proportional to the time required from the inception of the altitude capture maneuver to the final capture of the preselected altitude. The value of K appearing at terminal 22, is supplied to summation device 13 via lead 23 and to multiplier 26 via lead 24.

The output of summation device 13 on lead 14 represents the value of T in equation (2) above and is a measure of the time remaining or time-to-go before the commencement of the altitude capture maneuver.

The value of T is supplied to variable limiter 40 via lead 14. The variable limiter 40 is conventionally constructed to permit the predetermined maximum allowable command to pitch servo 40 when the value of T is larger than some predetermined value, for example, 60 seconds. However, as the time to capture initiation gets shorter, the limits on the Mach command signal on lead 39 are likewise reduced so that when the time T approaches zero, the limit is also near zero. Thus, at or near capture initiation, there can be no large pitch command to the autopilot and hence no excessive g producing transient.

As the aircraft approaches the preselected altitude at some, say a high, rate of climb, an altitude will be reached where that altitude deviation $h_e$ will equal the altitude rate times the maximum value of K, the output of limiter 20 through multiplier 26 in accordance with equation (1). This produces a null output from summing junction 7 and null detector 59 will trip closing switch 44 with contact 43 and initiating the altitude capture maneuver. The action of limiter 20 on the value of K is such that at high values of altitude rate, the initial value of K is a predetermined high value, for example, 45 seconds. As discussed previously, a constant value of K produces a commanded asymptotic flight path toward the preselected altitude. As the aircraft proceeds along the commanded asymptotic flight path, $\dot{h}_a$ will decrease causing the output of gain G1 on lead 19 to decrease in a like fashion. When the value on lead 19 has decreased to a value less than the predetermined maximum, the output of limiter 20, (the value of K) will be continuously proportional to the altitude rate $\dot{h}_a$. This action results in the command of a circular flight path through the action of $K\dot{h}_a$ which appears on the output of multiplier 26 on lead 27. As the altitude rate $\dot{h}_a$ continues to decrease, its value appearing on lead 19 will decrease in a like fashion. When the value appearing on lead 19 becomes less than some predetermined minimum value, limiter 20 will maintain the value of K at that low constant value and the commanded path will transform into a flight path asymptotic to the preselected altitude. Thus, it will be seen that limiter 20 adapts the capture flight path to whatever altitude rate the aircraft is flying at capture initiation and accomplishes this without exceeding the maximum g level set by gain G1.

Figure 2:
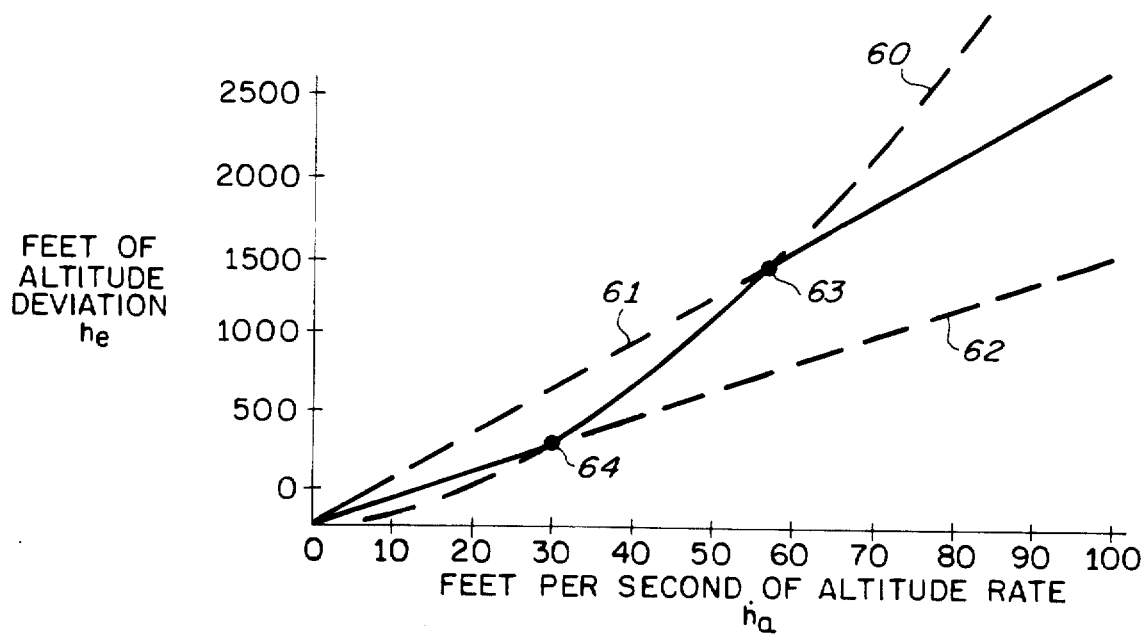
FIG. 2 is a graph of altitude deviation, $h_e$, versus altitude rate, $h_a$, showing the effects of the value of K.

The action just described is illustrated in FIG. 2, which is a graph of altitude deviation $h_e$ vs. altitude rate $\dot{h}_a$. Lines 61 and 62 represent solutions to equation (1) above where line 61 represents a maximum constant value of K and line 62 represents a minimum constant value of K. These solutions will result in asymptotic flight paths to the preselected altitude. Line 60 represents the solution to the above equation where K is proportional to $\dot{h}_a$ and results in a flight path circular in nature to the preselected altitude.

The action of limiter 20 is such as to command flight path 61 (which is defined by the maximum limit) until the value of $\dot{h}_a$ becomes less than the value corresponding to point 63. At point 63, the value of K varies with $\dot{h}_a$ and the commanded path is circular in nature and remains thus until $\dot{h}_a$ becomes less than the value corresponding to point 64. At point 64, the value of K is limited to a minimum constant value and an asymptotic path is commanded until the preselected altitude has been achieved.

It will be clear that the shape of the commanded flight path, asymptotic or circular, is dependent on the value of $\dot{h}_a$ when the altitude maneuver commences. If the altitude rate $\dot{h}_a$ causes the signal on lead 19 to exceed the maximum value allowed by limiter 20, the commanded flight path will initially be asymptotic, then circular and finally asymptotic once again. If the initial signal on lead 19 is less than the maximum allowed by limiter 20, the commanded flight path will initially be circular and then asymptotic. If the signal on lead 19 is initially less than the minimum allowed by limiter 20, the commanded flight path will be solely asymptotic. All of these flight paths will be achieved without exceeding the predetermined maximum normal acceleration or g level.

Figure 3:
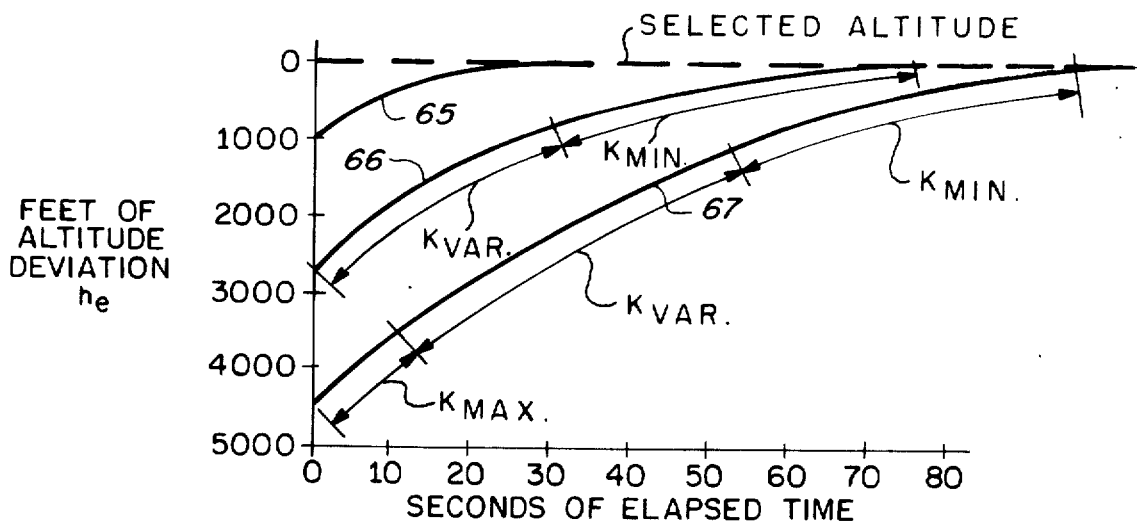
FIG. 3 is a graph illustrating various commanded altitude capture paths at a specific altitude rate at commencement of the capture maneuver.

FIG. 3 is a graph illustrative of altitude deviation $h_e$ and elapsed time from the commencement of the altitude capture maneuver. Line 65 illustrates the commanded flight path for a constant minimum value of K. It will be seen that it asymptotically approaches the selected altitude with no circular portion. Line 66 illustrates the commanded flight path when the value of K remains below the maximum limit of the limiter 20 and a circular capture maneuver results until the value of K reaches the minimum when an asymptotic path is commanded. Line 67 illustrates the commanded flight path where K is initially the maximum constant, then varies with $\dot{h}_a$ and finally is the minimum constant. Thus, the flight path varies from asymptotic to circular to finally asymptotic again.

From the foregoing, it will now be appreciated that the present invention provides the following improved altitude capture features:

(1) The command to the pitch servo from any automatic pilot pitch submode is continuously limited as a function of the time remaining before the altitude capture manuever is to commence.

(2) The command to the pitch servo from any automatic pilot submode is reduced to null just prior to the commencement of the altitude capture maneuver thereby reducing or eliminating any prior mode to altitude capture mode transients.

(3) The commanded flight path to achieve the preselected altitude is either asymptotic, circular, or a combination thereof depending upon the altitude rate of the aircraft either at capture initiation or during the capature maneuver.

While the invention has been described in its preferred embodiment, it is to be understood that the words which have been used are words of description rather than of limitation and that many changes or alterations may be made without departing from the true scope and spirit of the invention in its broader aspects.

I claim:

1. Automatic flight control apparatus for controlling an aircraft to approach, initiate and thereafter execute a capture flight path to a preselected altitude comprising
    (a) means for providing a signal proportional to the error between the existing altitude of the aircraft and said preselected altitude,
    (b) means for providing a signal proportional to the actual altitude rate of the aircraft,
    (c) means responsive to said altitude rate signal and to a predetermined value of normal acceleration for providing a signal characterizing the shape of said capture flight path at captive initiation for controlling the aircraft to follow an asymptotic flight path to said preselected altitude, a circular flight path to said preselected altitude or a combination of both, said asymptotic and circular paths all dependent upon the magnitude of said altitude rate signal,
    (d) unipolar means for varying the value of said characterizing signal between maximum and minimum limiting values,
    (e) means for providing a combined signal representative of said altitude rate signal and said characterizing signal,
    (f) means responsive to said characterizing signal, said altitude rate signal, and said altitude error signal for providing a signal representative of a time period prior to the initiation of said capture flight path, and
    (g) means responsive to an algebraic sum of said altitude error signal and said combined signal to provide a pitch command signal for executing said capture flight path.

2. The apparatus as set forth in claim 1 wherein the value of said characterizing signal is maintained constant above said maximum value.

3. The apparatus as set forth in claim 2 wherein the value of said characterizing signal is maintained constant below said minimum value.

4. The apparatus as set forth in claim 3 wherein the value of said characterizing signal between said maximum and minimum values is varied linearly with the absolute value of said altitude rate signal.

5. The apparatus as set forth in claim 4 wherein the means for providing said characterizing signal further includes
   (a) means for controlling the gain of said altitude rate signal in accordance with said predetermined value of acceleration normal to said capture flight path.

6. The apparatus as set forth in claim 1 wherein the apparatus for controlling the approach of said aircraft to said capture flight path comprises
   (a) means for providing an error signal proportional to the error between an actual flight control parameter indicative of an automatic flight control submode and a predetermined value of said parameter,
   (b) means responsive to said error signal for controlling the aircraft flight path in a sense to reduce said parameter error signal to zero, and
   (c) means responsive to said time period signal for limiting the value of said parameter error signals.

7. The apparatus as set forth in claim 6 wherein said limiting means comprises variable limiter means.

8. In an automatic flight control apparatus for controlling an aircraft to approach, initiate and thereafter execute a capture flight path to a preselected altitude, said flight path being defined by the control law $$h_e - K\dot{h}_a = 0$$

where
   $h_e$ = the error between said preselected altitude and the existing altitude of the aircraft
   $\dot{h}_a$ = the actual altitude rate of the aircraft and
   K = a constant characterizing the shape of the capture flight path and time required to capture said preselected altitude,
the combination comprising
   (a) means for providing a signal proportional to $\dot{h}_a$,
   (b) first limiter means responsive to said $\dot{h}_a$ signal for providing a first constant signal value of K for values of said $\dot{h}_a$ signal greater than a predetermined maximum value and a second constant signal value of K for values of said $\dot{h}_a$ signal equal to or less than a predetermined minimum value, said first and second constant signal values of K determining an asymptotic approach path to said preselected altitude, said limiter means further providing intermediate signal values of K continuously proportional to the value of said $\dot{h}_a$ signal, said intermediate signal values of K determining a circular approach path to said preselected altitude.

9. In the apparatus as set forth in claim 8 wherein said means for providing a signal proportional to $\dot{h}_a$ comprises means responsive to said $\dot{h}_a$ signal for providing a signal proportional to its absolute value.

10. In the apparatus as set forth in claim 9 wherein said means for providing said absolute value signal further comprises gain control means responsive to said absolute value signal for controlling the value thereof such that the resultant $\dot{h}_a$ signal corresponds to a normal acceleration on said aircraft equal to less than a predetermined maximum value.

11. In the apparatus as set forth in claim 10 further comprising
   (a) means for providing a signal proportional to $h_e$,
   (b) multiplying means responsive to said signal proportional to $\dot{h}_a$ and said first, second, and intermediate K signals for providing a signal proportional to $K\dot{h}_a$, and
   (c) means for providing a flight path control signal proportional to the algebraic sum of said $h_e$ and $K\dot{h}_a$ signals.

12. In the apparatus as set forth in claim 11 further comprising
   (a) means for providing a signal proportional to the absolute value of $h_e$,
   (b) means for providing a signal proportional to the quotient of said absolute value of $h_e$ divided by $\dot{h}_a$, and
   (c) means for subtracting a signal proportional to K provided by said limiter means from said quotient signal to provide a signal proportional to a time period prior to the initiation of said capture flight path.

13. In the apparatus as set forth in claim 12 further comprising
   (a) means for providing a precapture flight control error signal indicative of an automatic flight control submode, and
   (b) variable limiter means responsive to said time period signal and said flight control error signal for reducing the limits imposed on the value of said flight control error signal prior to the initiation of said capture flight path execution in accordance with signals from said first limiter means.

* * * * *